United States Patent
Deng

(10) Patent No.: US 9,342,756 B2
(45) Date of Patent: May 17, 2016

(54) METHODS AND APPARATUS TO DETECT DIFFERENCES BETWEEN IMAGES

(71) Applicant: The Nielsen Company (US), LLC, New York, NY (US)

(72) Inventor: Kevin Keqiang Deng, Safety Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/753,820

(22) Filed: Jun. 29, 2015

(65) Prior Publication Data

US 2015/0302272 A1 Oct. 22, 2015

Related U.S. Application Data

(63) Continuation of application No. 13/867,765, filed on Apr. 22, 2013, now Pat. No. 9,076,070, which is a continuation of application No. 12/754,361, filed on Apr. 5, 2010, now Pat. No. 8,433,142.

(51) Int. Cl.
| | |
|---|---|
| *G06K 9/00* | (2006.01) |
| *G06K 9/62* | (2006.01) |
| *G06F 17/22* | (2006.01) |
| *G06T 7/00* | (2006.01) |
| *G06F 17/30* | (2006.01) |

(52) U.S. Cl.
CPC .......... *G06K 9/6202* (2013.01); *G06F 17/2288* (2013.01); *G06F 17/3028* (2013.01); *G06K 9/00483* (2013.01); *G06K 9/6203* (2013.01); *G06T 7/0026* (2013.01)

(58) Field of Classification Search
None
See application file for complete search history.

(56) References Cited

U.S. PATENT DOCUMENTS

| | | |
|---|---|---|
| 5,592,569 A | 1/1997 | Li |
| 5,610,659 A | 3/1997 | Maturi et al. |
| 6,031,607 A | 2/2000 | Miyazaki |

(Continued)

FOREIGN PATENT DOCUMENTS

| | | |
|---|---|---|
| EP | 2375361 | 10/2011 |
| WO | 2008034001 | 3/2008 |

OTHER PUBLICATIONS

"How the Change Detection Works," <http://ecocam.evsc.virginia.edu/change_detection_description/change_detection_description>, accessed on Jan. 20, 2010 (5 pages).

(Continued)

*Primary Examiner* — Aaron W Carter
(74) *Attorney, Agent, or Firm* — Hanley, Flight & Zimmerman, LLC

(57) ABSTRACT

Methods and apparatus to detect differences between images are disclosed. Example methods disclosed herein include determining whether a difference between a block of pixels of a first image represented by a first signature and a block of pixels of a reference image represented by a second signature matching the first signature is resolvable using a transformation operation. Example methods disclosed herein also include, in response to determining the difference is unresolvable using the transformation operation, including the block of pixels of the first image in a difference region of the first image. Example methods disclosed herein further include generating a third signature different from the difference region of the first image to represent the difference region of the first image, and storing the third signature with version information associated with first image.

17 Claims, 10 Drawing Sheets

(56) References Cited

U.S. PATENT DOCUMENTS

| | | |
|---|---|---|
| 6,111,984 A | 8/2000 | Fukasawa |
| 6,154,567 A | 11/2000 | McGarry |
| 6,295,374 B1 | 9/2001 | Robinson et al. |
| 6,577,346 B1 | 6/2003 | Perlman |
| 6,633,651 B1 | 10/2003 | Hirzalla et al. |
| 7,020,336 B2 | 3/2006 | Cohen-Solal et al. |
| 7,227,893 B1 | 6/2007 | Srinivasa et al. |
| 7,274,825 B1 | 9/2007 | Lee et al. |
| 7,558,429 B2 | 7/2009 | Lin et al. |
| 2002/0041705 A1 | 4/2002 | Lin et al. |
| 2003/0083850 A1 | 5/2003 | Schmidt et al. |
| 2004/0189873 A1 | 9/2004 | Konig et al. |
| 2006/0153296 A1 | 7/2006 | Deng |
| 2007/0070199 A1 | 3/2007 | Kung |
| 2007/0230758 A1 | 10/2007 | Fan et al. |
| 2008/0068622 A1 | 3/2008 | Deng et al. |
| 2008/0178117 A1 | 7/2008 | Gelman et al. |
| 2008/0225125 A1 | 9/2008 | Silverstein et al. |
| 2009/0123025 A1 | 5/2009 | Deng et al. |
| 2009/0125510 A1 | 5/2009 | Graham et al. |
| 2009/0180698 A1 | 7/2009 | Ramani et al. |
| 2009/0208097 A1 | 8/2009 | Husseini et al. |
| 2010/0002774 A1 | 1/2010 | Kondo et al. |
| 2010/0306043 A1* | 12/2010 | Lindsay ............... G06Q 30/02 705/14.41 |
| 2010/0310192 A1* | 12/2010 | Kuchibhotla ........ G06K 9/2063 382/282 |
| 2010/0318892 A1* | 12/2010 | Teevan ............... G06F 17/3089 715/229 |
| 2011/0197121 A1 | 8/2011 | Kletter |
| 2011/0243459 A1 | 10/2011 | Deng |
| 2011/0276946 A1 | 11/2011 | Pletter |
| 2012/0121019 A1 | 5/2012 | Sato |
| 2012/0189066 A1 | 7/2012 | Kameyama et al. |
| 2013/0114907 A1 | 5/2013 | Deng et al. |
| 2013/0230256 A1 | 9/2013 | Deng |
| 2014/0006922 A1* | 1/2014 | Smith ................. G06F 17/2211 715/234 |
| 2014/0250360 A1 | 9/2014 | Jiang et al. |
| 2014/0281872 A1 | 9/2014 | Glover |
| 2015/0302272 A1* | 10/2015 | Deng ................... G06K 9/6203 382/219 |

OTHER PUBLICATIONS

Hoad et al., "Video Similarity Detection for Digital Rights Management," Australian Computer Society, Inc., Twenty-Sixth Australasian Computer Science Conference, Adelaide, Australia, 2003 (9 pages).
Radke et al., "Image Change Detection Algorithms: A Systematic Survey," Department of Electrical, Computer, and Systems Engineering, Rensselaer Polytechnic Institute, Aug. 19, 2004 (32 pages).
Radke et al., "Image Change Detection Algorithms: A Systematic Survey," IEEE Transactions on Image Processing, vol. 14, No. 3, Mar. 2005 (14 pages).
USPTO, "Office Action," issued in connection with U.S. Appl. No. 12/754,361, dated Aug. 10, 2012 (12 pages).
USPTO, "Notice of Allowance," issued in connection with U.S. Appl. No. 12/754,361, dated Jan. 4, 2013 (8 pages).
European Patent Office, "European Search Report", issued in connection with European Patent Application No. 11002843.8, dated Oct. 30, 2014 (5 pages).
United States Patent and Trademark Office, "Notice of Allowance", issued in connection with U.S. Appl. No. 13/867,765, dated Feb. 27, 2015 (13 pages).

* cited by examiner

METHODS AND APPARATUS TO DETECT DIFFERENCES BETWEEN IMAGES

RELATED APPLICATION(S)

This patent arises from a continuation of U.S. patent application Ser. No. 13/867,765 (now U.S. Pat. No. 9,076,070), entitled "Methods and Apparatus to Detect Differences between Images" and filed on Apr. 22, 2013, which is a continuation of U.S. patent application Ser. No. 12/754,361 (now U.S. Pat. No. 8,433,142), entitled "Methods and Apparatus to Detect Differences between Images" and filed on Apr. 5, 2010. U.S. patent application Ser. No. 12/754,361 and U.S. patent application Ser. No. 13/867,765 are hereby incorporated by reference in their respective entireties, and priority to the above-referenced applications is hereby claimed.

FIELD OF THE DISCLOSURE

This disclosure relates generally to image processing and, more particularly, to methods and apparatus to detect differences between images.

BACKGROUND

Print and other image-based advertisements often have more than one version, with each version corresponding to some minor modification of a reference (e.g., parent) advertisement. For example, a particular family of print advertisements can be based on a reference (e.g., parent) advertisement displaying a common background image and common information (e.g., for the product/service being advertised), but with each particular version also displaying version specific information (e.g., logos, prices, addresses, phone numbers, dates, etc., corresponding to a particular market, advertising campaign, etc.) overlaid on the background image. Video advertisements (e.g., commercials) can similarly have more than one version. Advertisers are often interested in not only detecting occurrences of their print/image/video advertisements, but also determining which version of the advertisement was detected. Many conventional advertisement version detection techniques are entirely manual and involve an analyst visually comparing a sample image representative of a detected advertisement to each possible version of the advertisement. Other conventional techniques utilize pixel-wise comparison techniques to highlight pixels in the sample image that differ from the reference advertisement, thereby allowing the analyst to focus his/her attention on only the highlighted regions to identify which version of the advertisement was detected. However, in practice, a common background used for a family of advertisements may be slightly altered (intentionally or unintentionally) during post-production of a particular version of the advertisement. Such alterations can cause existing pixel-wise comparison techniques to be prone to false highlighting or over highlighting of the sample images being analyzed.

DETAILED DESCRIPTION

Figure 1:
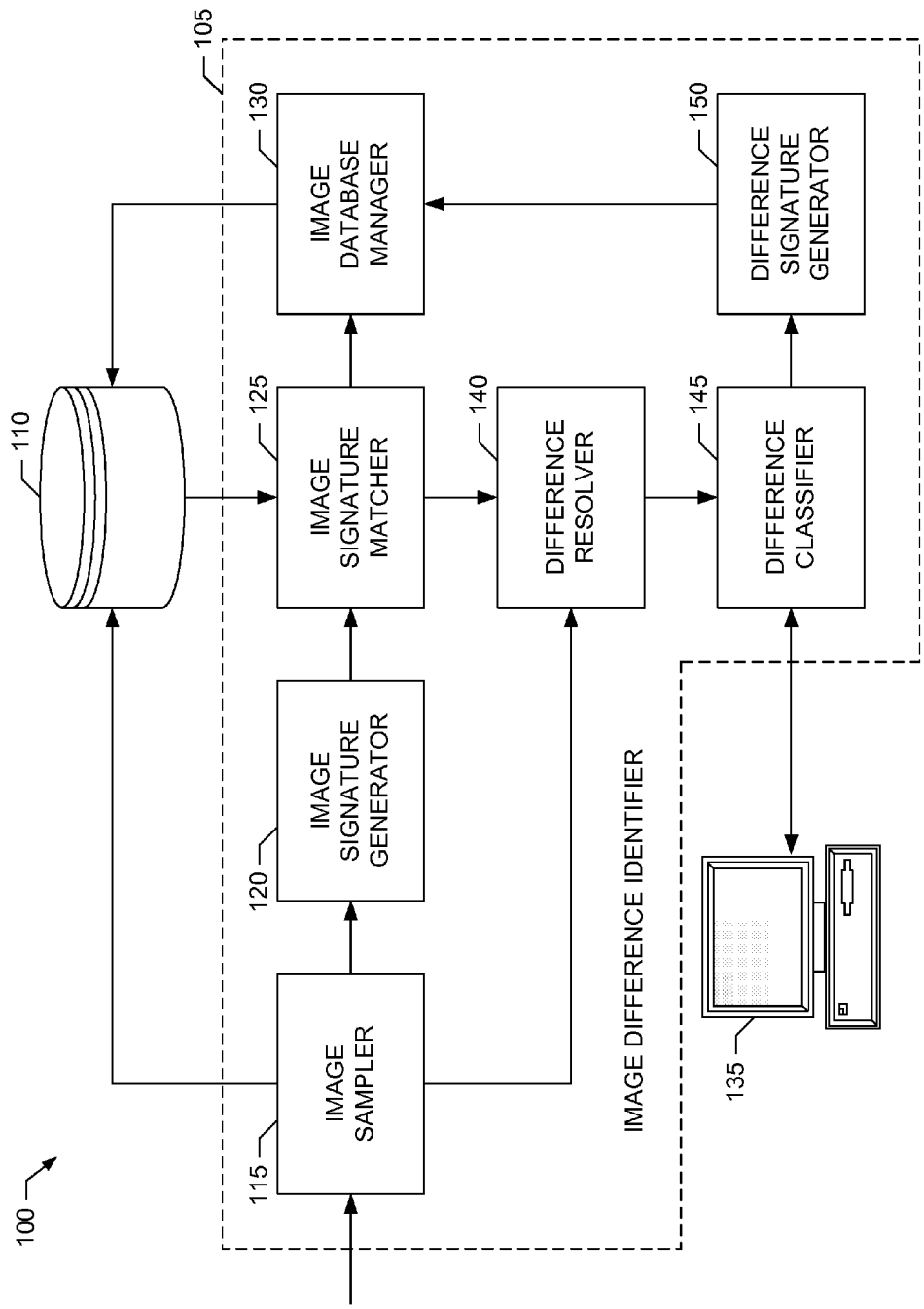
FIG. 1 is block diagram of an example image difference identification system capable of identifying differences between images according to the example techniques described herein.

Methods and apparatus to detect differences between images are disclosed herein. Although the following discloses example methods and apparatus including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example techniques to detect differences between images described herein include example techniques to identify differences between images and example techniques to recognize differences between images. Generally, the purpose of difference identification is to determine the different versions of a reference advertisement, determine the image regions that differ between advertisements and determine descriptive information to represent and categorize the different advertisement versions. In contrast, the purpose of difference recognition is generally to recognize a sample image as corresponding to an already identified and categorized (e.g., via difference identification) version of a reference advertisement. As described in greater detail below, many of the example techniques described herein utilize elastic block-wise (also referred to as patch-wise) image comparison, along with further transformation techniques, to detect and highlight differences between images to enable advertisement version identification. These example techniques also generate information representative of the detected and highlighted differences to enable automated recognition of a detected advertisement as corresponding to a particular version.

In an example technique to identify image differences described herein, an example image signature matcher compares a sample image signature representative of a sample image (e.g., corresponding to an advertisement being identified) and a plurality of reference image signatures representative of a respective plurality of reference images (e.g., corresponding to different possible advertisements and/or advertisement versions) to select a reference image similar to the sample image (e.g., corresponding to an advertisement at least in the same family as the advertisement being identified) . Then, an example difference resolver determines whether a difference between a first block of pixels of the sample image and a second block of pixels of the selected reference image is resolvable using a transformation operation. Examples of such transformation operations include, but are not limited to, shift operations, intensity adjustments, color adjustments, etc. In this example, when the difference between the first and second blocks is determined to be unresolvable, but not when the difference between the first and second blocks is determined to be resolvable, the difference resolver includes the first block in an unresolved difference region of the sample image. In this way, blocks that are resolvable using a transformation operation can be ignored as being caused by, for example, post-production alterations, minor distortion during transmission and/or storage, etc., whereas blocks that are not resolvable likely correspond to an actual content difference between advertisement versions. In at least some examples, the unresolvable blocks are presented to a human analyst for confirmation. Then, after all blocks of the sample image are processed, an example difference signature generator generates a difference signature representative of the unresolved (e.g., and confirmed) difference region, with the difference signature to be used to represent and identify the unresolved (e.g., and confirmed) difference region of the sample image. For example, the unresolved (e.g., and confirmed) difference region corresponds to a version-specific region of the advertisement being identified, and the difference signature is stored for use in recognizing this version-specific region in later difference recognition processing.

In an example technique to recognize image differences described herein, an example image signature generator generates a sample image signature representative of a sample image (e.g., representative of a detected advertisement). Then, an example image signature matcher obtains a reference image (e.g., corresponding to a reference, or parent, version of the detected advertisement) associated with a reference image signature determined to substantially match the sample image signature. Next, a difference signature generator generates a difference signature representative of a first region of the sample image corresponding spatially with (e.g., having the same size, shape and location as) a reference difference region associated with a first version (e.g., of potentially a family of different versions) of the reference image (e.g., as determined by prior difference identification processing). Then, a difference signature matcher compares the generated difference signature and a reference difference signature representative of the reference difference region (e.g., as determined by prior difference identification processing) to determine whether the sample image corresponds to the first version of the reference image (e.g., and, therefore, the detected advertisement corresponds to the first version of the reference advertisement).

At least some of the example techniques to detect differences between images described herein provide substantial benefits over conventional techniques. For example, as mentioned above, many conventional advertisement version detection techniques are entirely manual and involve an analyst visually comparing a sample image representative of a detected advertisement to each possible version of the advertisement. Unlike such manual techniques, advertisement version detection performed using the example image difference detection techniques described herein is substantially automated with, for example, unresolved difference region(s) of a sample image being identified and highlighted automatically for analyst evaluation. Furthermore, unlike conventional pixel-wise comparison techniques that are prone to false highlighting or over highlighting of the sample images being analyzed, the example image difference detection techniques described herein utilize elastic block-wise (also referred to as patch-wise) image comparison that accounts for and is blind to (e.g., and thus can discard or ignore) differences resulting from post-production alterations and/or other such transformation operations and, instead, focuses on differences likely to be actual changes in content between advertisement versions, thereby yielding more robust and accurate difference identification and highlighting, at least under some operating scenarios.

Turning to the figures, a block diagram of an example image difference identification system 100 capable of identifying differences between images according to the example techniques described herein is illustrated in FIG. 1. The image difference identification system 100 of FIG. 1 includes an example image difference identifier 105 to compare sample images with reference images stored in, for example, a storage unit 110 to determine whether the sample image corresponds to a version of one or more of the reference images and, if so, to identify one or more version-specific difference regions in the sample image. In an example implementation, the sample image is representative of a detected advertisement undergoing analysis, and the reference images stored in the storage unit 110 represent reference advertisements, each of which may have multiple versions as described above. The storage unit 110 may be implemented by any type of a storage or memory device, a database, etc., such as the mass storage device 1030 and/or the volatile memory 1018 included in the example processing system 1000 of FIG. 10, which is described in greater detail below.

In the illustrated example of FIG. 1, the image difference identifier 105 includes an example image sampler 115 to obtain the sample image representative of, for example, a detected advertisement undergoing analysis. The image sampler 115 can be implemented by any image sampling technology or combination of technologies compatible with the media format(s) of the advertisements to be processed. For example, in the case of print advertisements, the image sampler 115 can be implemented by a scanner, camera or any other optical sensor capable of generating an electronic image representative of a print advertisement. As another example, in the case video advertisements, the image sampler 115 can be implemented by a video processor, frame grabber, camera or any other optical sensor capable of generating an image frame of the video advertisement.

The image difference identifier 105 employs image signatures to automatically identify one or more reference images stored in the storage unit 110 that are substantially similar to the sample image obtained by the image sampler 115. Generally, an image signature is a proxy representative of the associated image, and can take the form of, for example, one or more digital values, a waveform, a thumbnail image, etc. Because image signatures are proxies representing their associated images, the signatures of two images can be compared to determine whether their respective images are substantially similar or identical. Generally, if two image signatures substantially match (e.g., at least within some tolerance or deviation level), then the respective images they represent are substantially similar or identical. Typically, signature comparison is simpler and requires less processing resources than direct image comparison. In the illustrated example, the image difference identifier 105 employs image signatures in which two images that are substantially similar except for one or more difference regions (e.g., corresponding to different versions of an advertisement) will usually have substantially matching signatures (e.g., at least within some tolerance level). Examples of types of image signatures capable of being employed by the image difference identifier include, but are not limited to, the examples described in U.S. Patent Publication No. 2008/0068622, entitled "Methods and Apparatus to Identify Images in Print Advertisements" and published on Mar. 20, 2008, U.S. Publication No. 2006/0153296, entitled "Digital Video Signature Apparatus and Methods for Use with Video Program Identification Systems" and published on Jul. 13, 2006, U.S. Pat. No. 6,633,651, entitled "Method and Apparatus for Recognizing Video Sequences" and issued on Oct. 14, 2003, and U.S. Pat. No. 6,577,346, entitled "Recognizing a Pattern in a Video Segment to Identify the Video Segment" and issued on Jun. 10, 2003. U.S. Patent Publication Nos. 2008/0068622 and 2006/0153296, and U.S. Pat. Nos. 6,633,651 and 6,577,346, are hereby incorporated by reference in their respective entireties.

To determine a sample image signature representative of the sample image obtained by the image sample 115, the image difference identifier 105 includes an example image signature generator 120. The image signature generator 120 generates the sample image signature using any appropriate signature generation technique, such as the example techniques described in U.S. Patent Publication Nos. 2008/0068622 and 2006/0153296, and U.S. Pat. Nos. 6,633,651 and 6,577,346, mentioned above. The sample image signature generated by the image signature generator 120 is provided to an example image signature matcher 125. The image signature matcher 125 compares the sample image signature to one or more reference image signatures stored in the storage unit 110 and representative of a respective one or more reference images also stored in the storage unit 110. The image signature matcher 125 can implement various comparison criteria, such as a cross-correlation value, a Hamming distance, etc., to determine whether two signatures match or substantially match within a particular tolerance level (e.g., which may be predetermined, specified as a configuration parameter or input, etc.).

If the image signature matcher 125 determines that the sample image signature does not match any reference image signature in the storage unit 110, an example image database manager 130 included in the image difference identifier 105 instructs or otherwise causes the image sampler 115 to store the sample image in the storage unit 110 for use as a new reference image corresponding to a new reference advertisement. The image database manager 130 also causes the sample image to be displayed on an example user configuration terminal 135 to allow an analyst to analyze the sample image. Furthermore, the analyst is prompted to enter descriptive information via the terminal 135 to characterize the new reference advertisement to be associated with the displayed sample image. The descriptive information is then stored with the sample image in the storage unit 110. Further description of the user interface terminal 135 is provided below.

Figure 2:
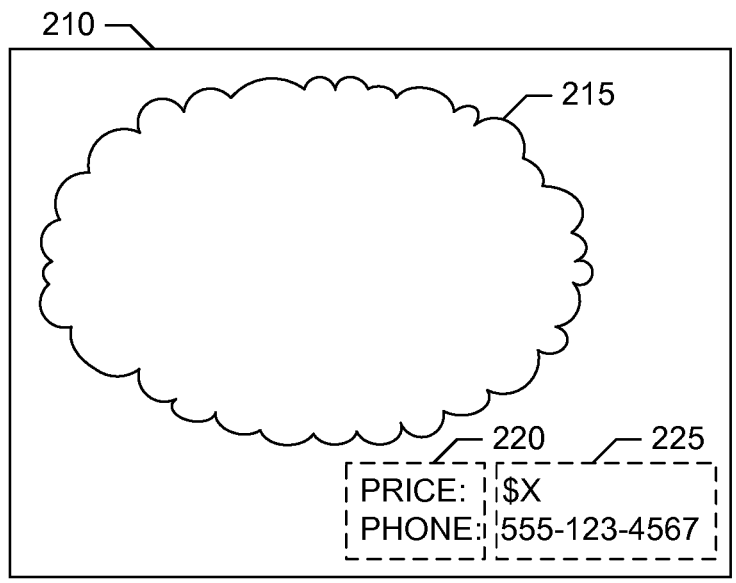
FIG. 2 illustrates example sample and reference images to be processed by the image difference identification system of FIG. 1.
Figure 2:
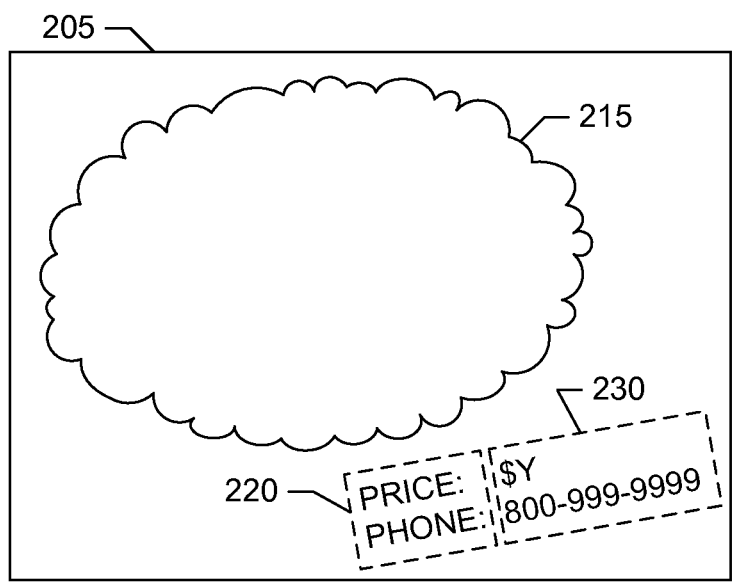

If, however, the image signature matcher 125 determines that the sample image signature substantially matches a reference image signature in the storage unit 110, the image signature matcher 125 provides the sample image and the selected matching reference image to an example difference resolver 140 included in the image difference identifier 105. For illustrative purposes, an example sample image 205 and an example reference image 210 that could be determined by the image signature matcher 125 to substantially match are illustrated in FIG. 2. The sample image 205 and the reference image 210 correspond to different versions of the same advertisement. In particular, both images include a common background image region 215 and a common text region 220 having content that is unchanged between the different versions of the advertisement, although these regions may undergo post-production alteration (e.g., such as the illustrated rotation of the regions 215 and 220 in the sample image 205 relative to the reference image 210). However, the images also include version-specific regions containing information and/or other content specific to the particular version of the advertisement represented by each image. For example, the reference image 210 includes a first version-specific region 225 containing price and contact information specific to a first version of the advertisement. Similarly, the sample image 205 includes a second version-specific region 230 containing price and contact information specific to a second version of the advertisement. As such, although the image signature matcher 125 can determine that the sample image 205 and the reference image 210 substantially match (e.g., due to substantially matching image signatures resulting from the prevalence of the common regions 215 and 220), each image also contains version-specific regions (e.g., the regions 225 and 230) corresponding to the different versions of the advertisement represented by the sample image 205 and the reference image 210.

Figure 3:
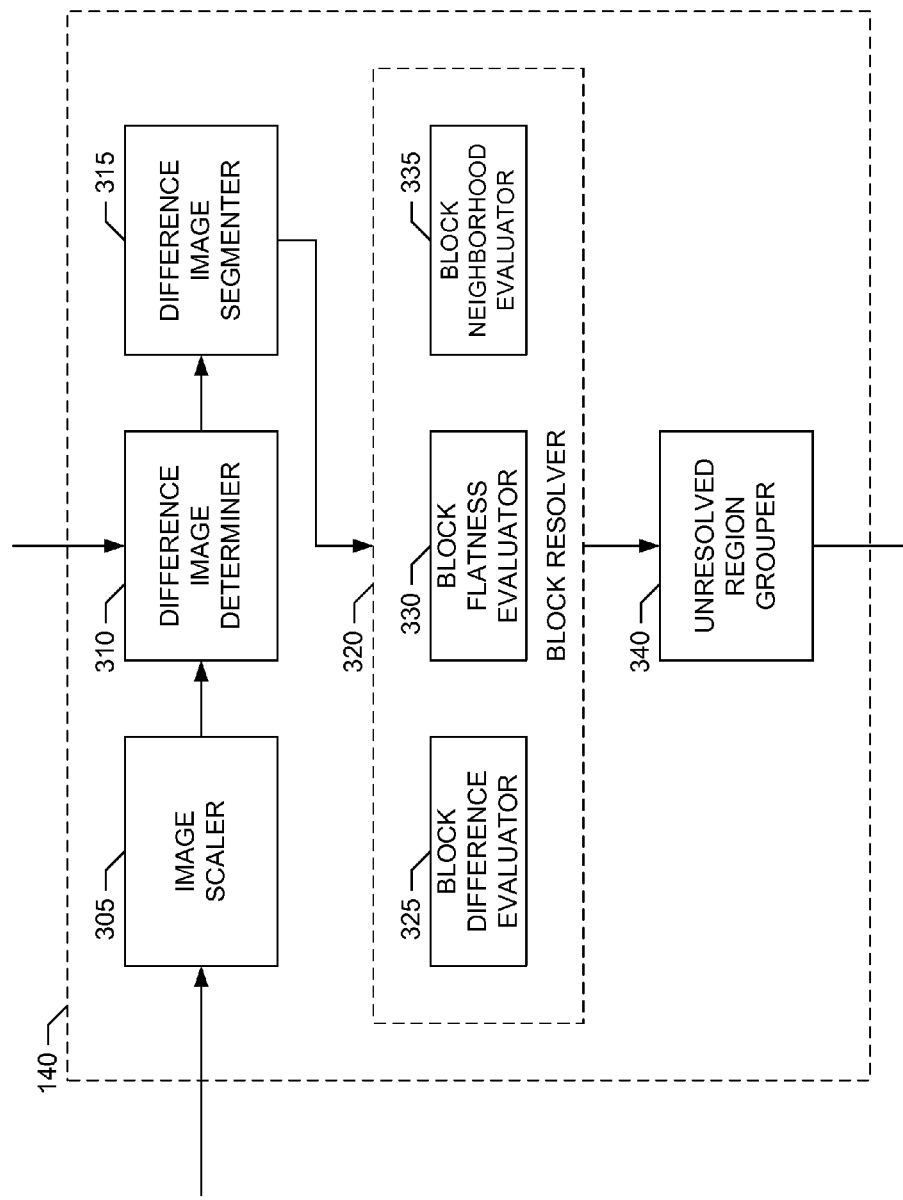
FIG. 3 is a block diagram of an example difference resolver to resolve differences between images that may be used to implement the image difference identification system of FIG. 1.

Returning to FIG. 1, and with reference to FIG. 2, the difference resolver 140 determines whether there are any regions of difference (e.g., such as the regions 225 and 230) between the sample image and the reference image determined by the image signature matcher 125 to substantially match (e.g., such as the images 205 and 210). Such regions of difference, also referred to herein as difference regions, can correspond to regions of version-specific information that vary among different versions of a reference, or parent, advertisement. However, difference regions can also result from one or more image transformation operations being performed intentionally or unintentionally during storage, transmission, reception, etc., of the image or video advertisement. In the illustrated example, the difference resolver 140 implements elastic block-wise (also referred to as patch-wise) image comparison to resolve difference regions resulting from post-production alterations of other such image transformation operations. As such, the difference resolver 140 can account for and discard or ignore resolvable difference regions caused by such post-production alterations and/or image transformation operations and, instead, focus identification on any unresolvable difference region(s) in the sample image likely to correspond to actual differences between advertisement versions represented by the respective sample and reference images. An example implementation of the difference resolver 140 is illustrated in FIG. 3 and described in greater detail below.

Assuming the difference resolver 140 identifies an unresolved difference region in the sample image, an example difference classifier 145 included in the image difference identifier 105 obtains classification information to identify, for example, the advertisement version corresponding to the unresolved difference region. To obtain such classification information, the difference classifier 145 of the illustrated example causes the sample image to be displayed on the user configuration terminal 135 with the unresolved difference region being highlighted (e.g., by varying the intensity and/or color of the sample image in the unresolved difference region). Additionally, in at least some example implementations, the difference classifier 145 causes the selected matching reference image to also be displayed on the user configuration terminal 135 with a region of the reference image corresponding spatially with the unresolved difference region of the sample image also being highlighted (e.g., to allow efficient, side-by-side comparison of these regions of the two images). In at least some examples, an analyst can activate a zooming/expanding feature to cause only a portion of the sample image and the matching reference image at the same location (e.g., the location of the unresolved difference region) to be displayed (e.g., with or without highlighting). Furthermore, the analyst is prompted to enter classification information via the terminal 135 to characterize the advertisement version corresponding to the highlighted, unresolved difference region of the sample image. The entered classification information is provided to the difference classifier 145 for storage in the storage unit 110. Additionally, the analyst can indicate that a particular highlighted region is insignificant and, thus, can be ignored. This indication and associated descriptive information of the highlighted region can be stored in the storage unit 110 such that, when a similar difference region is encountered again, it can be ignored as being insignificant. The user configuration terminal 135 can be implemented by, for example, a computer terminal, a computer workstation, a laptop/notebook, a personal digital assistant (PDA), a mobile phone, etc., or any other type of user input device.

In the illustrated example, the image difference identifier 105 also includes an example difference signature generator 150 to generate a difference signature for each unresolved difference region of the sample image identified by the difference resolver 140. Similar to an image signature generated by the image signature generator 120, a difference signature generated by the difference signature generator 150 is generated from characteristics of the unresolved difference region and is a proxy (e.g., such as one or more digital values, a waveform, a thumbnail image, etc.) representative of the unresolved difference region. Alternatively, the difference signature generated by the difference signature generator 150 for an unresolved difference region could be a copy of the some or all of the unresolved difference region itself (e.g., such as when the unresolved difference region is relatively small). Generally, the difference signatures generated by the difference signature generator 150 are larger (e.g., more descriptive) than the image signatures generated by the image signature generator 120 to ensure that the difference signature is a unique proxy representative of its associated difference region (e.g., to reduce false detection of advertisement versions that could result when different difference regions corresponding to different advertisement versions are represented by the same or substantially similar difference signatures). In an example implementation, the difference signature generated by the difference signature generator 150 is a small image (e.g., such as a copy of some or all of the associated difference region itself, or a thumbnail or other lower resolution image) representative of the unresolved difference region. Other example techniques that may be used by the difference signature generator 150 to generate difference signatures include, but are not limited to, the examples described in U.S. Patent Publication Nos. 2008/0068622 and 2006/0153296, and U.S. Pat. Nos. 6,633,651 and 6,577,346, mentioned above.

The classification information obtained by the difference classifier 145 and the difference signature generated by the difference signature generator 150 for an unresolved difference region of the sample image identified by the difference resolver 140 are provided to the image database manager 130 for storage in the storage unit 110. In an example implementation, the image database manager 130 appends the classification information, the difference signature and difference region location information as a new entry in a record maintained for the matching reference image. The image database manager 130 also annotates the new entry to indicate that the new entry corresponds to a particular version, as identified in the classification information, of the reference advertisement corresponding to the reference image. The stored classification information, difference signature and difference region location information can then be used during subsequent image difference recognition processing, as described in greater detail below.

While an example manner of implementing the image difference identifier 105 has been illustrated in FIG. 1, one or more of the elements, processes and/or devices illustrated in FIG. 1 may be combined, divided, re-arranged, omitted, eliminated and/or implemented in any other way. Further, the example storage unit 110, the example image sampler 115, the example image signature generator 120, the example image signature matcher 125, the example image database manager 130, the example difference resolver 140, the example difference classifier 145, the example difference signature generator 150 and/or, more generally, the example image difference identifier 105 of FIG. 1 may be implemented by hardware, software, firmware and/or any combination of hardware, software and/or firmware. Thus, for example, any of the example storage unit 110, the example image sampler 115, the example image signature generator 120, the example image signature matcher 125, the example image database manager 130, the example difference resolver 140, the example difference classifier 145, the example difference signature generator 150 and/or, more generally, the example image difference identifier 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example image difference identifier 105, the example storage unit 110, the example image sampler 115, the example image signature generator 120, the example image signature matcher 125, the example image database manager 130, the example difference resolver 140, the example difference classifier 145 and/or the example difference signature generator 150 are hereby expressly defined to include a tangible medium such as a memory, digital versatile disk (DVD), compact disk (CD), etc., storing such software and/or firmware. Further still, the example image difference identifier 105 of FIG. 1 may include one or more elements, processes and/or devices in addition to, or instead of, those illustrated in FIG. 1, and/or may include more than one of any or all of the illustrated elements, processes and devices.

A block diagram of an example implementation of the difference resolver 140 of FIG. 1 is illustrated in FIG. 3. The difference resolver 140 of FIG. 3 includes an example image scaler 305 to scale a sample image obtained via the image sampler 115 to coincide with the size of a matching reference image selected by the image signature matcher 125. Additionally or alternatively, the image scaler 305 can perform any other image registration operation (e.g., such as rotation, deskewing, cropping, etc.) to cause the sample image to coincide with the matching reference image in terms of size, shape, spatial orientation, etc.

Figure 4:
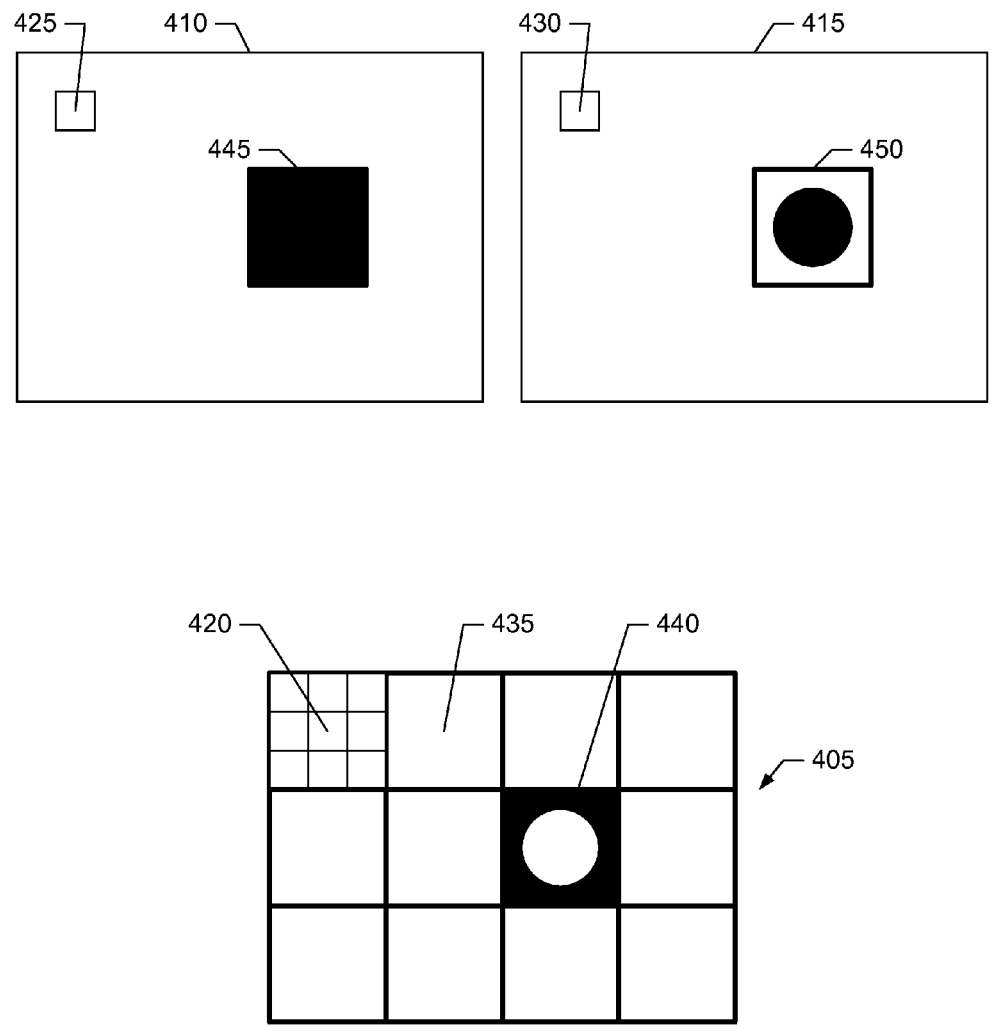
FIG. 4 illustrates example sample, reference and difference images to be processed by the difference resolver of FIG. 3.

The difference resolver 140 of FIG. 3 also includes an example difference image determiner 310 to determine a difference image based on the sample image and the reference image. In an example implementation, the difference image determiner 310 determines a pixel-wise difference image by computing the difference (e.g., in terms of luminance, color map, etc.) between respective pixels of the sample image and the reference image. For illustrative purposes, an example difference image 405 that could be determined by the difference image determiner 310 based on an example sample image 410 (e.g., such as the sample image 205) and an example reference image 415 (e.g., such as the reference image 210) is illustrated in FIG. 4. In the example of FIG. 4, each pixel 420 of the difference image 405 is determined by computing the difference between respective pixels 425 and 430 of the sample image 410 and the reference image 415.

In at least some examples supporting video processing, multiple references images may be used to represent a particular video segment (e.g., containing a reference advertisement of interest), with the reference images taken at different intervals of the segment. In such examples, rather than creating and processing difference images corresponding to each reference image of the video segment, the difference image determiner 310 may instead: (1) obtain a single sample image representative of the entire video segment, (2) compare the sample image to each of the multiple reference images for the video segment, and then (3) output a single difference image corresponding to the sample image and reference image comparison yielding the smallest (e.g., minimum) difference.

Returning to FIG. 3, the illustrated example difference resolver 140 further includes an example difference image segmenter 315 to partition the difference image determined by the difference image determiner 310 into blocks (also referred to as patches) each containing multiple pixels. For example, with reference to FIG. 4, the difference image segmenter 315 could partition the difference image 405 into multiple blocks 435 each containing multiple pixels 420. In an example implementation, the size of each block 435 into which the difference image 405 is partitioned is predetermined, specified as a configuration input or otherwise set based on a size of the image differences expected to be encountered in an unresolved difference region being processed by the difference resolver 140. For example, if the expected differences correspond to different phone numbers, prices, etc., corresponding to difference advertisement versions, the size and shape of each block 435 could be set to be some fractional or multiple of the size of a character in the character set used for the phone numbers, prices, etc., in the advertisement.

Returning to FIG. 3, the segmented difference image is provided to an example block resolver 320 included in the difference resolver 140. The block resolver 320 determines whether any of the blocks of the segmented difference image indicate a significant difference (also referred to as a substantial difference) between the sample image and the reference image and, if so, whether such a difference is resolvable as being caused by post-production alterations or other such transformation operations and, thus, is not associated with an actual advertisement version difference. For example, a significant (or substantial) difference between two images may correspond to an actual difference in image content (e.g., such as the two images containing different image objects at a particular location), whereas an insignificant (or insubstantial) difference that can be ignored may correspond to minor color and/or intensity variations or other minor discrepancies/distortion between the two images. As noted above, a difference (e.g., a significant or substantial difference) is considered resolvable if, for example, one or more transformation operations could be performed on either or both of the images being compared to eliminate (or substantially eliminate within some tolerance or deviation level) this difference between the two images. To perform its processing, the block resolver 320 includes an example block difference evaluator 325 to determine a difference metric (e.g., such as a sum of pixel values in a block of the difference image) for each block in the segmented difference image. In an example implementation, the block difference evaluator 325 compares a block's difference metric with a threshold. If the threshold is not exceeded, thereby indicating no significant difference between the sample and reference images at that block's location, the block difference evaluator 325 discontinues processing of that block. However, if the threshold is exceeded, thereby indicating a significant difference between the sample and reference images at that block's location, the block difference evaluator 325 forms a sample block from the sample image corresponding spatially with the block of the difference image, as well as a reference block from the reference image also corresponding spatially with the block of the difference image. For example, with reference to FIG. 4, if the block difference evaluator 325 were to determine that the distance metric associated with a block 440 of the difference image 405 exceeds the threshold, the block difference evaluator 325 would form a sample block 445 from the sample image 410 and a reference block 450 from the reference image 415 both corresponding spatially with the block 440 of the difference image 405.

Returning to FIG. 3, if the block difference evaluator 325 forms a sample block from the sample image and a reference block from the reference image because the associated block in the difference image has a difference metric indicating a significant difference between these blocks, the block difference evaluator 325 provides the sample block of the sample image and the reference block of the reference image to an example block flatness evaluator 330 included in the block resolver 320. The block flatness evaluator 330 determines whether the difference between the sample block of the sample image and the reference block of the reference image is resolvable using a transformation operation corresponding to, for example, an intensity adjustment or a color adjustment. For example, the block flatness evaluator 330 determines whether the sample block of the sample image is flat or, in other words, whether the sample block includes pixels exhibiting a substantially similar first color and first intensity. Similarly, the block flatness evaluator 330 determines whether the reference block of the reference image is flat or, in other words, whether the reference block includes pixels exhibiting a substantially similar second color and second intensity. The second color and/or intensity may be similar to or different from the first color and/or intensity. If both the sample block and the reference block are determined to be flat, the block flatness evaluator 330 determines that the difference between the sample block and the reference block can be resolved by transforming the sample image using either or both of an intensity or color adjustment (e.g., either globally or locally at the location of the sample block). In this case, the difference was likely caused by post-production alteration, such as use of a different paper color, different gray levels, different color levels, etc., for a particular print advertisement, different gains for a video advertisement, etc., and/or other intensity/color changes occurring during storage, transmission, reception, etc., of the advertisement corresponding to the sample image and is not indicative of a different advertisement version.

However, if the block flatness evaluator 330 determines that either or both of the sample block and the reference block are not flat, an example block neighborhood evaluator 335 included in the block resolver 320 is invoked. The block neighborhood evaluator 335 determines whether the difference between the sample block of the sample image and the reference block of the reference image is resolvable using a transformation operation corresponding to shift operation. For example, with reference to FIG. 4, the block neighborhood evaluator 335 determines whether the sample block (e.g., block 445) of the sample image substantially matches any block of pixels of the reference image in a neighborhood of blocks adjacent to the reference block (e.g., block 450). If the sample block is determined to match a block in the neighborhood of the reference block, the block neighborhood evaluator 335 determines that the difference between the sample block and the reference block can be resolved by transforming the sample image by shifting the image (e.g., either globally or locally at the location of the sample block) and, thus, the difference was likely caused by post-production alteration and/or during storage, transmission, reception, etc., of the advertisement corresponding to the sample image and is not indicative of a different advertisement version.

If the block resolver 320 does not determine a transformation operation capable of resolving the difference between the sample block of the sample image and the reference block of the reference image, the block resolver 320 indicates that the difference is unresolvable. The block resolver 320 also invokes an example unresolved region grouper 340 included in the difference resolver 140 of FIG. 3 to include the unresolved sample block in an unresolved difference region of the sample image. After all blocks of the difference image are processed, the unresolved region grouper 340 outputs any unresolved difference region(s) of the sample image for subsequent processing by, for example, the difference classifier 145 and the difference signature generator 150.

While an example manner of implementing the difference resolver 140 of FIG. 1 has been illustrated in FIG. 3, one or more of the elements, processes and/or devices illustrated in FIG. 3 may be combined, divided, re-arranged, omitted, eliminated and/or implemented in any other way. Further, the example image scaler 305, the example difference image determiner 310, the example difference image segmenter 315, the example block resolver 320, the example block difference evaluator 325, the example block flatness evaluator 330, the example block neighborhood evaluator 335, the example unresolved region grouper 340 and/or, more generally, the example difference resolver 140 of FIG. 3 may be implemented by hardware, software, firmware and/or any combination of hardware, software and/or firmware. Thus, for example, any of the example image scaler 305, the example difference image determiner 310, the example difference image segmenter 315, the example block resolver 320, the example block difference evaluator 325, the example block flatness evaluator 330, the example block neighborhood evaluator 335, the example unresolved region grouper 340 and/or, more generally, the example difference resolver 140 could be implemented by one or more circuit(s), programmable processor(s), ASIC(s), PLD(s) and/or FPLD(s), etc. When any of the appended claims are read to cover a purely software and/or firmware implementation, at least one of the example difference resolver 140, the example image scaler 305, the example difference image determiner 310, the example difference image segmenter 315, the example block resolver 320, the example block difference evaluator 325, the example block flatness evaluator 330, the example block neighborhood evaluator 335 and/or the example unresolved region grouper 340 are hereby expressly defined to include a tangible medium such as a memory, DVD, CD, etc., storing such software and/or firmware. Further still, the example difference resolver 140 of FIG. 3 may include one or more elements, processes and/or devices in addition to, or instead of, those illustrated in FIG. 3, and/or may include more than one of any or all of the illustrated elements, processes and devices.

Figure 5:
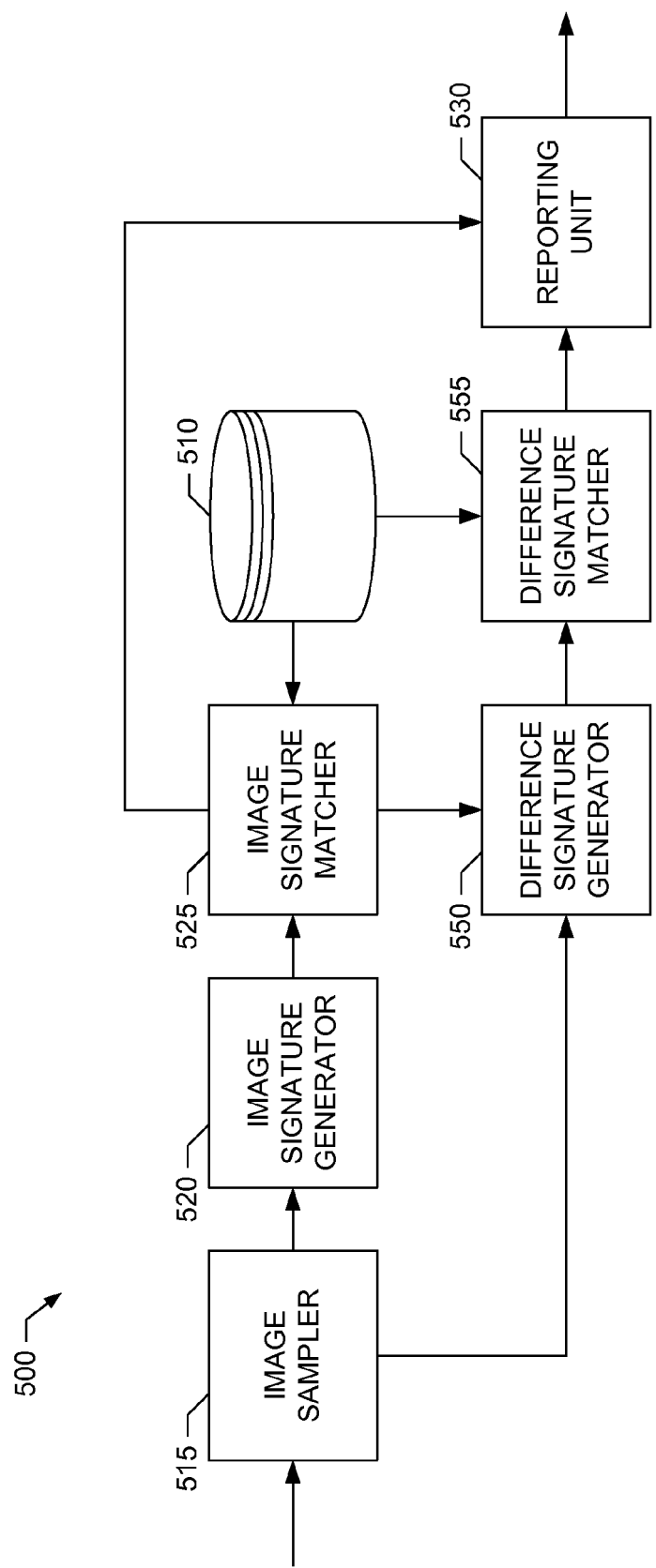
FIG. 5 is block diagram of an example image difference recognizer capable of recognizing differences between images according to the example techniques described herein.

A block diagram of an example image difference recognizer 500 capable of recognizing differences between images according to the example techniques described herein is illustrated in FIG. 5. The image difference recognizer 500 includes an example image sampler 515 to obtain a sample image representative of, for example, a detected advertisement undergoing analysis. For example, the image sampler 515 can be the same as, or implemented substantially similar to, the image sampler 115 of FIG. 1. The image difference recognizer 500 of FIG. 5 also includes an example image signature generator 520 to generate a sample image signature representative of the sample image obtained by the image sampler 515. For example, the image signature generator 520 can be the same as, or implemented substantially similar to, the image signature generator 120 of FIG. 1

The image difference recognizer 500 of FIG. 5 further includes an example image signature matcher 525 to compare the sample image signature generated by the image signature generator 520 to one or more reference image signatures stored in an example storage unit 510 and representative of a respective one or more reference images also stored in the storage unit 510. The reference images stored in the storage unit 510 correspond to respective reference advertisements and their associated different versions. The storage unit 510 can be the same as, or implemented substantially similar to, the storage unit 110 of FIG. 1, and the image signature matcher 525 can be the same as, or implemented substantially similar to, the image signature matcher 125 of FIG. 1. In the case of video advertisements, the image signature matcher 525 can also implement scene change detection to potentially reduce processing to one sample image and corresponding signature for a detected scene (e.g., instead of processing each sample image determined by the image sampler 515 and corresponding signature generated by the image signature generator 520). In such an example, the image signature matcher 525 stores a scene signature corresponding to a sample image representing a previously detected scene and for which reference image signature comparison has already been performed. For each subsequent image signature generated for each subsequent sample image (e.g., sample frame) of the video being analyzed, the image signature matcher 525 compares the new image signature with the stored scene signature. If the new image signature fails to match the stored scene signature (e.g., indicating a scene change), or the video ends, the new image signature is determined to be a new scene signature corresponding to a new scene and, thus, the image signature matcher 525 compares this new scene signature to the one or more reference image signatures as described above. In at least some example, the sample image corresponding to this new scene signature is also stored by the image signature matcher 525 as a key image representative of this new detected scene.

If the image signature matcher 525 determines that the sample image (e.g., scene) signature does not match any reference image signature in the storage unit 510, an example reporting unit 530 included in the image difference recognizer 500 generates a reporting record, entry, etc., or other reporting information to indicate that the sample image (e.g., or the images contained in the scene) does not correspond to any recognized version of any recognized advertisement corresponding to the reference image(s) stored in the storage unit 510. However, if the image signature matcher 525 determines that the sample image (e.g., scene) signature does match a reference image signature in the storage unit 510, the image signature matcher 525 selects the matching reference image from the storage unit 510. As noted above, each reference image is associated with one or more different versions of a reference advertisement. Each different version of the reference image is substantially similar except for one or more version-specific difference regions uniquely associated with each version of the reference image. For each reference image, the storage unit 510 stores version specific information, such as the version-specific difference regions associated with each version, as well as a difference signature representative of each difference region (e.g., as determined and generated by the image difference identification system 100 of FIG. 1) and other classification information. Accordingly, the image signature matcher 525 also invokes an example difference signature generator 550 to generate a difference signature representative of each region of the sample image corresponding spatially to a respective version-specific difference region classified as being associated with a particular version of the selected matching reference image (e.g., based on the classification information stored in the storage unit 510). In other words, the difference signature generator 550 generates a respective difference signature for each difference region or set of regions of the sample image specified by the stored classification information as corresponding to a different version of the matching reference image. The difference signature generator 550 can be the same as, or implemented substantially similar to, the difference signature generator 150 of FIG. 1.

The image difference recognizer 500 of FIG. 5 includes an example difference signature matcher 555 to compare the difference signature(s) generated by the difference signature generator 550 for the specified difference region(s) of the sample image with the respective reference difference signature(s) representative of the respective version-specific difference region(s) of the reference image to determine whether the sample image corresponds to a particular version of the reference image. If the generated difference signature(s) for the sample image and the respective reference difference signature(s) for a particular version of the reference image match, then the reporting unit 530 generates a reporting record, entry, etc., or other reporting information. Such generated reporting information indicates, for example, that the sample image corresponds to the particular version of the reference advertisement indicated by the classification information in the storage unit 510 as being associated with the matching reference difference signatures and respective difference regions. As such, by comparing reference signatures for version-specific reference image difference regions with corresponding difference signatures for the same regions of the sample image, the image difference recognizer 500 automatically recognizes whether the sample image corresponds to a particular version of an advertisement corresponding to the reference image.

While an example manner of implementing the image difference recognizer 500 has been illustrated in FIG. 5, one or more of the elements, processes and/or devices illustrated in FIG. 5 may be combined, divided, re-arranged, omitted, eliminated and/or implemented in any other way. Further, the example storage unit 510, the example image sampler 515, the example image signature generator 520, the example image signature matcher 525, the example reporting unit 530, the example difference signature generator 550, the example difference signature matcher 555 and/or, more generally, the example image difference recognizer 500 of FIG. 5 may be implemented by hardware, software, firmware and/or any combination of hardware, software and/or firmware. Thus, for example, any of the example storage unit 510, the example image sampler 515, the example image signature generator 520, the example image signature matcher 525, the example reporting unit 530, the example difference signature generator 550, the example difference signature matcher 555 and/or, more generally, the example image difference recognizer 500 could be implemented by one or more circuit(s), programmable processor(s), ASIC(s), PLD(s) and/or FPLD(s), etc. When any of the appended claims are read to cover a purely software and/or firmware implementation, at least one of the example image difference recognizer 500, the example storage unit 510, the example image sampler 515, the example image signature generator 520, the example image signature matcher 525, the example reporting unit 530, the example difference signature generator 550 and/or the example difference signature matcher 555 are hereby expressly defined to include a tangible medium such as a memory, DVD, CD, etc., storing such software and/or firmware. Further still, the example image difference recognizer 500 of FIG. 5 may include one or more elements, processes and/or devices in addition to, or instead of, those illustrated in FIG. 5, and/or may include more than one of any or all of the illustrated elements, processes and devices.

Flowcharts representative of example machine readable instructions that may be executed to implement and, some or all of the image difference identification system 100, the image difference identifier 105, the storage unit 110, the image sampler 115, the image signature generator 120, the image signature matcher 125, the image database manager 130, the difference resolver 140, the difference classifier 145, the difference signature generator 150, the image scaler 305, the difference image determiner 310, the difference image segmenter 315, the example block resolver 320, the block difference evaluator 325, the block flatness evaluator 330, the block neighborhood evaluator 335, the unresolved region grouper 340, the difference recognizer 500, the storage unit 510, the image sampler 515, the image signature generator 520, the image signature matcher 525, the reporting unit 530, the difference signature generator 550 and/or the difference signature matcher 555 are shown in FIGS. 6-9. In these examples, the machine readable instructions represented by each flowchart may comprise one or more programs for execution by: (a) a processor, such as the processor 1012 shown in the example processing system 1000 discussed below in connection with FIG. 10, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1012, but the entire program or programs and/or portions thereof could alternatively be executed by a device other than the processor 1012 and/or embodied in firmware or dedicated hardware (e.g., implemented by an application specific integrated circuit (ASIC), a programmable logic device (PLD), a field programmable logic device (FPLD), discrete logic, etc.).

For example, any or all of the image difference identification system 100, the image difference identifier 105, the storage unit 110, the image sampler 115, the image signature generator 120, the image signature matcher 125, the image database manager 130, the difference resolver 140, the difference classifier 145, the difference signature generator 150, the image scaler 305, the difference image determiner 310, the difference image segmenter 315, the example block resolver 320, the block difference evaluator 325, the block flatness evaluator 330, the block neighborhood evaluator 335, the unresolved region grouper 340, the difference recognizer 500, the storage unit 510, the image sampler 515, the image signature generator 520, the image signature matcher 525, the reporting unit 530, the difference signature generator 550 and/or the difference signature matcher 555 could be implemented by any combination of software, hardware, and/or firmware. Also, one or more of the machine readable instructions represented by the flowcharts of FIGS. 6-9 may be implemented manually. Further, although the example machine readable instructions are described with reference to the flowcharts illustrated in FIGS. 6-9, many other techniques for implementing the example methods and apparatus described herein may alternatively be used. For example, with reference to the flowcharts illustrated in FIGS. 6-9, the order of execution of the blocks may be changed, and/or some of the blocks described may be changed, eliminated, combined and/or subdivided into multiple blocks.

Figure 6:
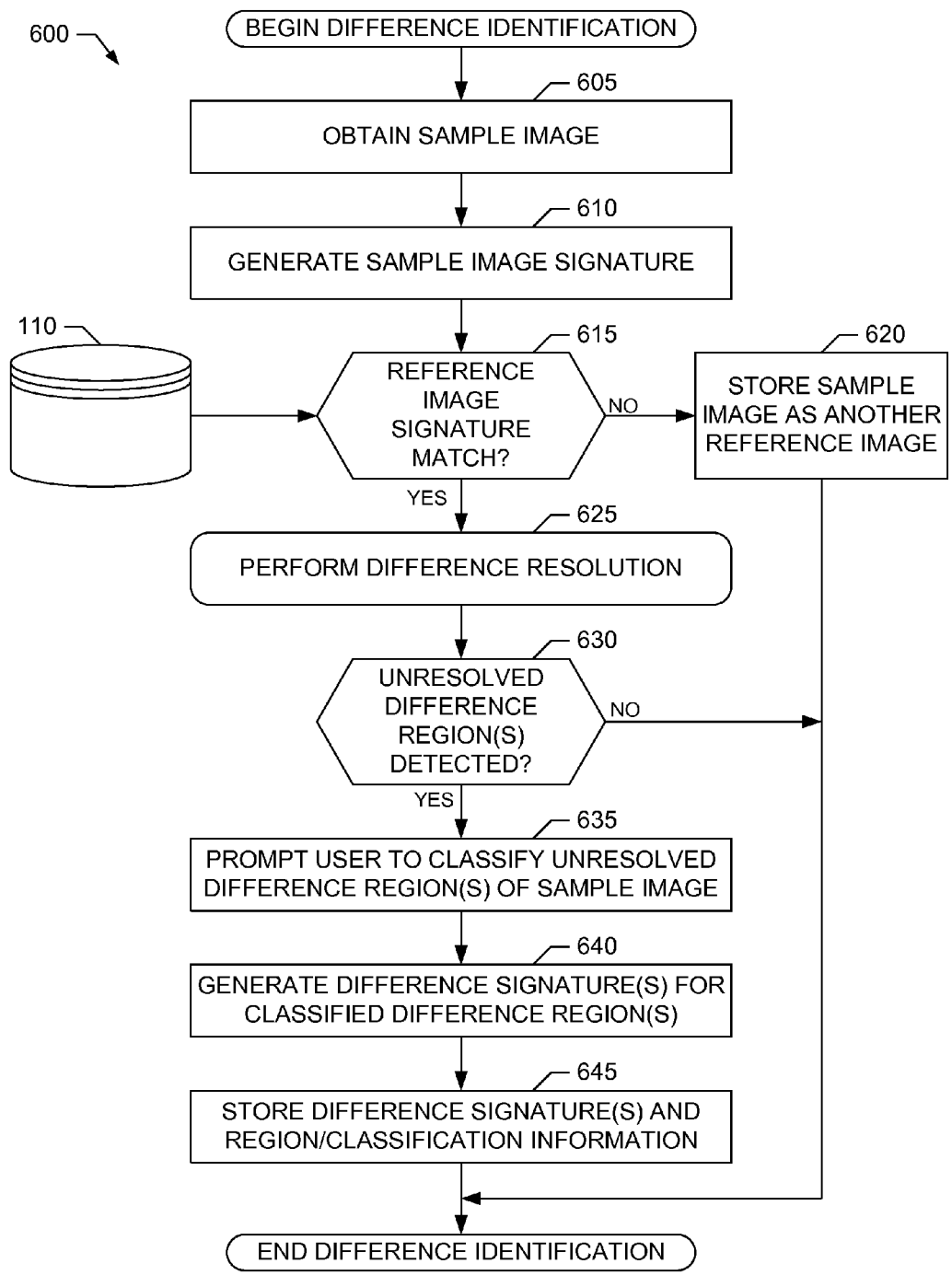
FIG. 6 is a flowchart representative of example machine readable instructions that may be executed to perform a difference identification process to implement the image difference identification system of FIG. 1.

Example machine readable instructions 600 that may be executed to perform a difference identification process to implement the image difference identifier 105 and, more generally, the image difference identification system 100 of FIG. 1 are illustrated in FIG. 6. The example machine readable instructions 600 may be executed at predetermined intervals, based on an occurrence of a predetermined event (e.g., such as obtaining or detecting a sample image corresponding to an advertisement to be identified), as a background process, etc., or any combination thereof. With reference to FIG. 1, the machine readable instructions 600 of FIG. 6 begin execution at block 605 at which the image sampler 115 included in the image difference identifier 105 samples or otherwise obtains a sample image representative of, for example, a detected advertisement undergoing version identification. At block 610, the image signature generator 120 included in the image difference identifier 105 generates a sample image signature representative of the sample image, as described above. Then, at block 615 the image signature matcher 125 included in the image difference identifier 105 compares the sample image signature generated at block 610 with one or more reference image signatures representative of a respective one or more reference images corresponding to respective reference advertisements. The reference image signatures and reference images are stored in a storage unit 110, as described above.

If the sample image signature does not match any reference image signature (block 615), then at block 620 the sample image is stored in the storage unit 110 for use as a new reference image corresponding to a potentially new reference advertisement. Descriptive information for classifying this new reference image is also obtained at block 620, for example, after the new reference image is confirmed by an analyst to correspond to a new reference advertisement. Additionally or alternatively, at block 620 the detection of an unmatched sample image can be reported, which could cause further analysis of the sample image to be performed (e.g., to determine whether the unmatched sample image is representative of a new advertisement). Execution of the machine readable instructions 600 then ends.

Figure 7:
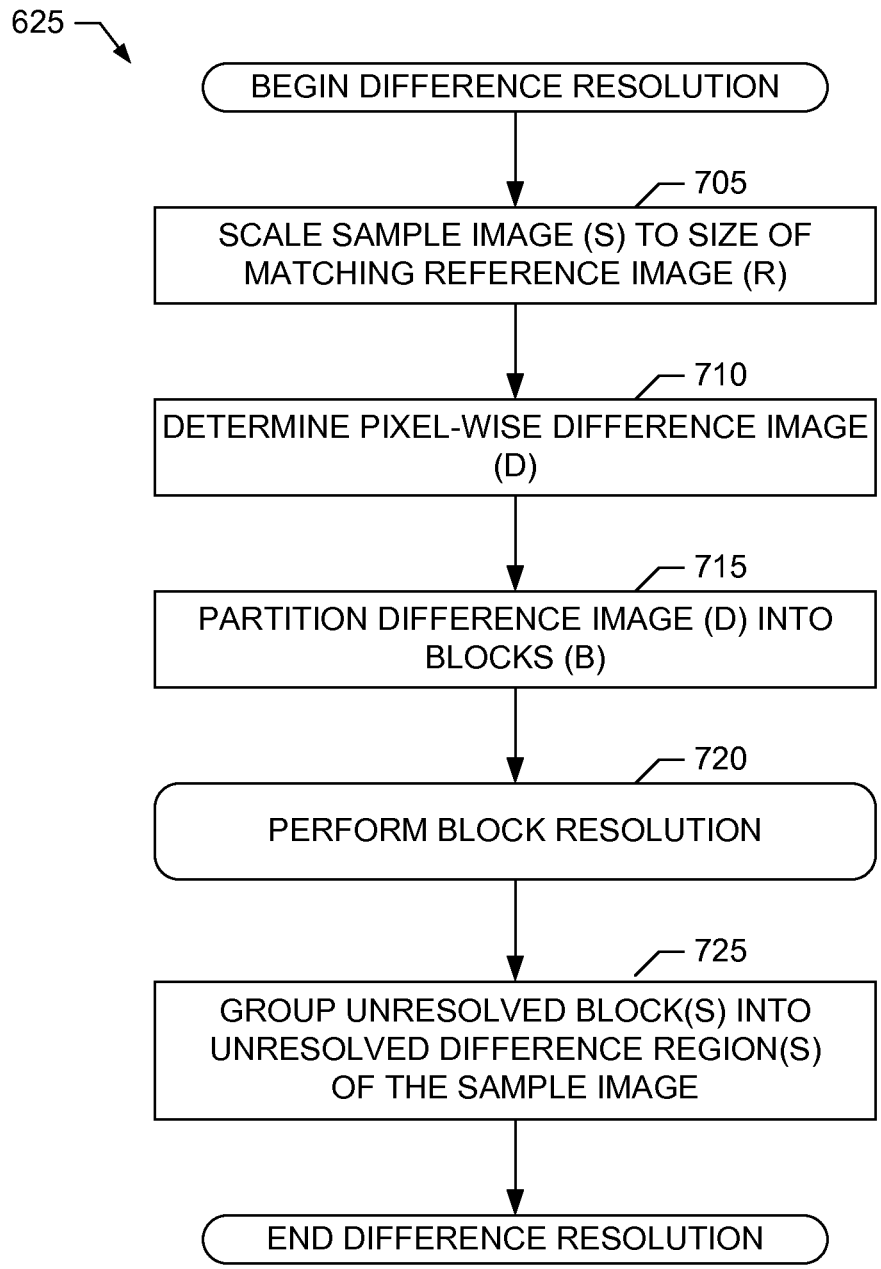
FIG. 7 is a flowchart representative of example machine readable instructions that may be used to implement the example machine readable instructions of FIG. 6 and/or executed to perform a difference resolution process to implement the difference resolver of FIG. 3 and/or the image difference identification system of FIG. 1.

However, if the sample image signature does match (or substantially matches) a reference image signature (block 615), the image signature matcher 125 selects the matching reference image. At block 625, the difference resolver 140 included in the image difference identifier 105 determines whether any difference regions between the sample image and the reference image are not resolvable using one or more transformation operations and, thus, likely correspond to actual differences between advertisement versions represented by the respective sample and reference images. Example machine readable instructions that may be used to perform the difference resolution processing at block 625 are illustrated in FIG. 7 and described in greater detail below.

If there are no unresolved difference regions identified by the difference resolution processing at block 625 (or, in other words, any difference regions are resolvable using one or more transformation operations), then at block 630 the sample image is determined to correspond to the reference advertisement represented by the matching reference image (because any differences between the sample and reference images were likely the result of post-production alterations and/or other such transformation operations). Therefore, execution of the example machine readable instructions 600 ends.

If, however, one or more unresolved regions are identified by the difference resolution processing (block 630), then at block 635 the difference classifier 145 included in the image difference identifier 105 prompts a user to classify the unresolved difference region(s) of the sample image by, for example, identifying a version of the reference advertisement to which the unresolved difference region(s) correspond, and/or by identifying one or more of the unresolved difference regions as representing insignificant differences that can be ignored. At block 640, the difference signature generator 150 included in the image difference identifier 105 generates difference signature(s) representative of the unresolved difference region(s). As discussed above, a difference signature generated at block 640 is typically different from the image signature generated at block 610. For example, the difference signature generated at block 640 is typically generated using only the respective unresolved difference region of the sample image, whereas the image signature generated at block 610 is typically generated using the entire sample image. Also, the difference signature generated at block 640 is typically larger than the image signature generated at block 610. For example, a difference signature generated at block 640 could be a copy of some or all of the associated unresolved difference region itself, a thumbnail image or a proxy value that is longer (e.g., has more digits or bits) than the image signature generated at block 610.

Then, at block 645 the image database manager 130 stores the classification information, difference region location information and respective difference signature(s) in the storage unit 110 as a new version of the reference advertisement corresponding to the matching reference image. Execution of the example machine readable instructions 600 then ends.

Example machine readable instructions 625 that may be used to implement the difference resolution processing at block 625 of FIG. 6 and/or the difference resolver 140 included in the image difference identifier 105 of FIG. 1 are illustrated in FIG. 7. With reference to the example implementation of the difference resolver 140 illustrated in FIG. 3, execution of the machine readable instructions 625 of FIG. 7 begins at block 705 at which the image scaler 305 included in the difference resolver 140 scales and/or performs any other registration operation(s) to cause the sample image to coincide with the matching reference image (or sequence of matching reference images in the case of video segment processing) in terms of size, shape, spatial orientation, etc. Then, at block 710 the difference image determiner 310 included in the difference resolver 140 determines a pixel-wise difference image by computing the difference between respective pixels of the sample image and the reference image. Alternatively, in the case of video segment processing, at block 710 the difference image determiner 310 can compare the sample image to each of the multiple reference images for the video segment, and then output a single difference image corresponding to the sample image and reference image comparison yielding the smallest (e.g., minimum) difference. Next, at block 715 the difference image segmenter 315 included in the difference resolver 140 partitions the difference image determined at block 710 into blocks (also referred to as patches) each containing multiple pixels, with the size of each block being based on the size of the image differences expected to be encountered when comparing different versions of an advertisement.

At block 720, the block resolver 320 included in the difference resolver 140 determines whether any of the blocks of the segmented difference image indicate a difference between the sample image and the reference image and, if so, whether the difference is resolvable as being caused by post-production alteration and/or one or more other such transformation operations and, thus, is not associated with an actual advertisement version difference. Example machine readable instructions that may be used to perform the block resolution processing at block 720 are illustrated in FIG. 8 and described in greater detail below.

After completion of the block resolution processing at block 720, at block 725 the unresolved region grouper 340 included in the difference resolver 140 groups any unresolved blocks into unresolved difference regions of the sample image. As discussed above, these unresolved difference regions can be highlighted to focus analysis on only those regions of the sample image that are likely to be specific to a particular version of the reference advertisement corresponding to the matching reference image. Execution of the example machine readable instructions 625 then ends.

Figure 8:
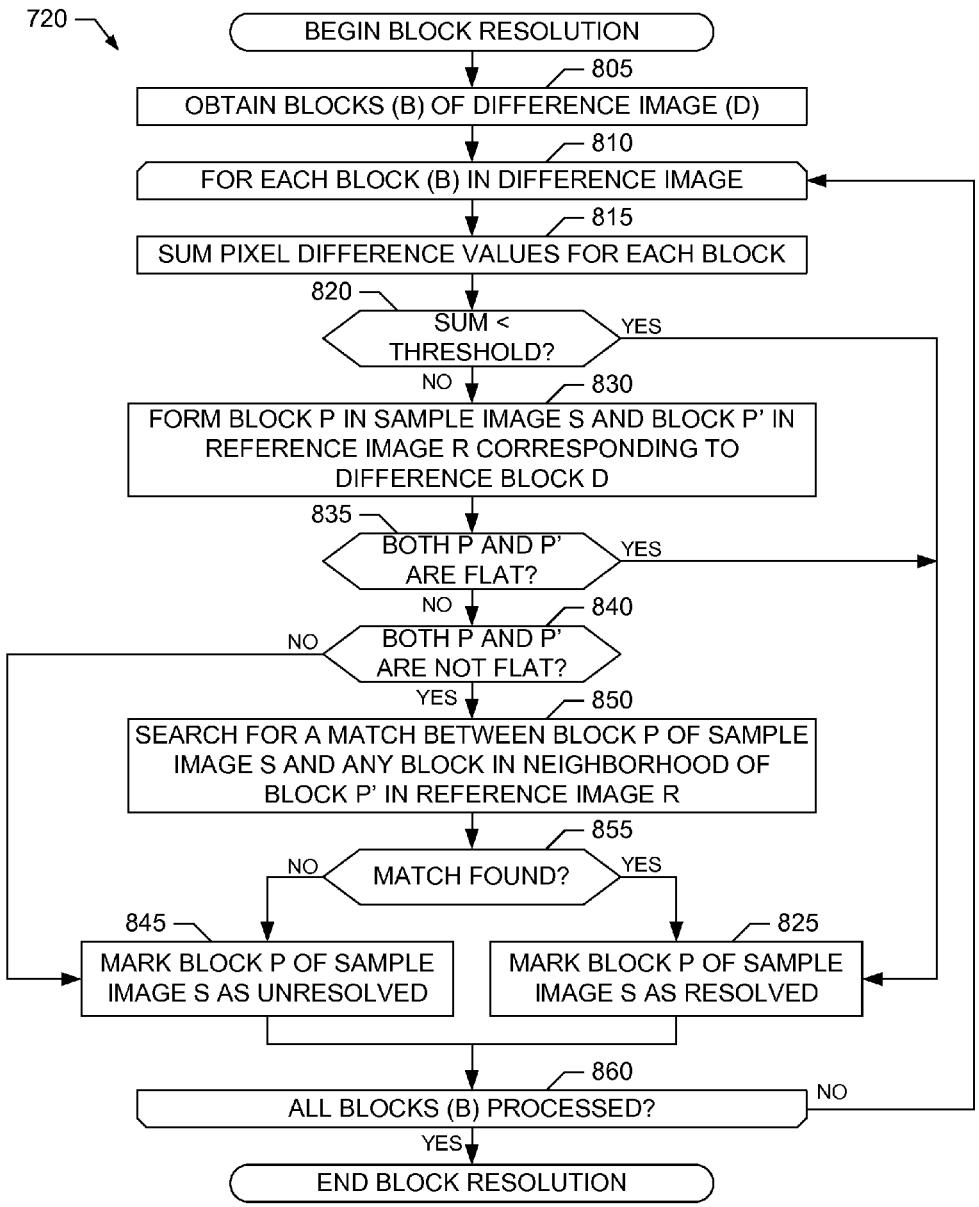
FIG. 8 is a flowchart representative of example machine readable instructions that may be used to implement the example machine readable instructions of FIG. 7 and/or executed to perform a block resolution process to implement the difference resolver of FIG. 3 and/or the image difference identification system of FIG. 1.

Example machine readable instructions 720 that may be used to implement the block resolution processing at block 720 of FIG. 7 and/or the block resolver 320 included in the difference resolver 140 of FIG. 3 are illustrated in FIG. 8. With reference to the example implementation of the block resolver 320 illustrated in FIG. 3, execution of the machine readable instructions 720 of FIG. 8 begins at block 805 at which the block resolver 320 obtains the blocks of the segmented difference image determined from the sample image and the matching reference image. Then, for each block in the difference image (block 810), the block difference evaluator 325 included in the block resolver 320 determines a difference metric corresponding to a sum of the pixel values in the block of the difference image being processed (block 815). Then, at block 820 the block difference evaluator 325 compares the block's difference metric with a threshold (e.g., which may be predetermined, specified as a configuration parameter, or otherwise set). If the threshold is not exceeded (block 820), thereby indicating no significant difference between the sample and reference images at that block's location, then at block 825 the block resolver 320 marks the block of the sample image corresponding spatially with the block of the difference image being processed as being resolved.

However, if the threshold is exceeded (block 820), thereby indicating a significant difference between the sample and reference images at that block's location, then at block 830 the block difference evaluator 325 forms a sample block (P) from the sample image corresponding spatially with the block of the difference image, and forms a reference block (P') from the reference image also corresponding spatially with the block of the difference image. Next, at block 825 the block flatness evaluator 330 included in the block resolver 320 determines whether both the sample block (P) from the sample image and the corresponding reference block (P') from the reference image are flat, which would indicate that the difference between the sample block (P) of the sample image and the reference block (P') of the reference image is resolvable using a transformation operation corresponding to, for example, an intensity adjustment or a color adjustment. If both the sample block (P) and the corresponding reference block (P') are flat (block 835), then at block 825 the block resolver 320 marks the sample block (P) as being resolved.

However, if at least one of the sample block (P) and the corresponding reference block (P') are not flat (block 835), then at block 840 the block flatness evaluator 330 determines whether both the sample block (P) and the corresponding reference block (P') are not flat. If one of the sample block (P) and the corresponding reference block (P') is flat and the other is not flat (block 840), then at block 845 the block resolver 320 marks the sample block (P) as being unresolved. If, however, both the sample block (P) and the corresponding reference block (P') are not flat (block 840), then at block 850 the block neighborhood evaluator 335 included in the block resolver 320 determines whether the sample block (P) of the sample image matches any block in the neighborhood of blocks adjacent to the reference block (P') of the reference image, which would indicate that the difference between the sample block (P) and the reference block (P') is resolvable using a transformation operation corresponding to a shift operation. For example, at block 850 the block neighborhood evaluator 335 can compute a correlation value (e.g., based on a pixel-wise difference) between each neighbor block adjacent to the reference block (P') and the sample block (P) and then compare the correlation value to a threshold to determine whether the sample block (P) substantially matches any neighbor block adjacent to the reference block (P'). If a matching neighbor block is found (block 855), then at block 825 the block resolver 320 marks the sample block (P) as being resolved. However, if a matching neighbor block is not found (block 855), then at block 845 the block resolver 320 marks the sample block (P) as being unresolved.

After all blocks of the difference image have been processed (block 860), execution of the example machine readable instructions 720 ends. In at least some example implementations, execution of the example machine readable instructions 720 is repeated to perform block resolution processing with the roles of the sample image and the reference image being reversed. The set of all unresolved blocks then becomes the union of unresolved blocks determined during each iteration of the block resolution processing.

Figure 9:
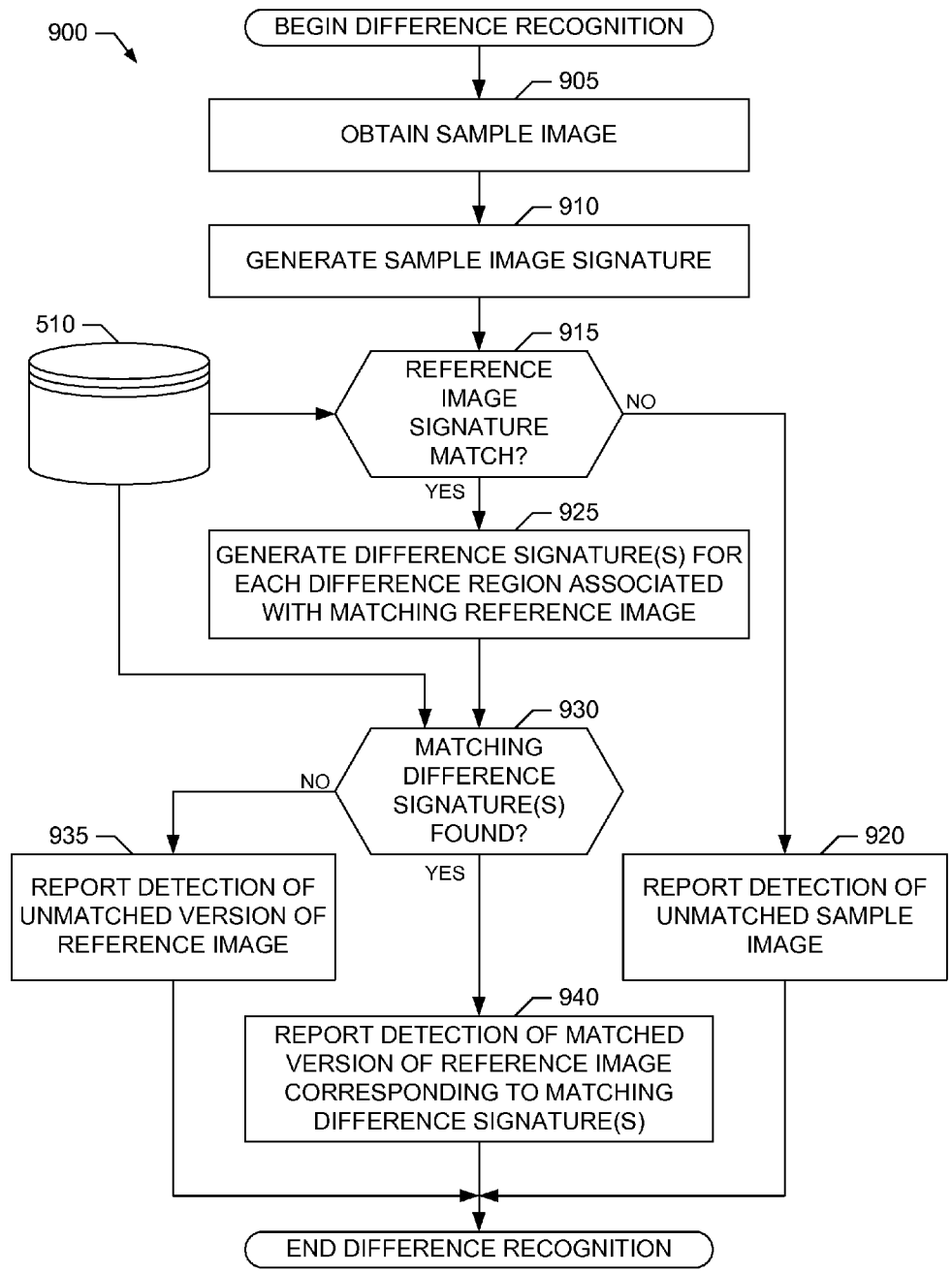
FIG. 9 is a flowchart representative of example machine readable instructions that may be executed to perform a difference recognition process to implement the image difference recognizer of FIG. 5.

Example machine readable instructions 900 that may be executed to perform a difference recognition process to implement the image difference recognizer 500 of FIG. 5 are illustrated in FIG. 9. The example machine readable instructions 900 may be executed at predetermined intervals, based on an occurrence of a predetermined event (e.g., such as the obtaining or detection of a sample image corresponding to an advertisement to be recognized), as a background process, etc., or any combination thereof. With reference to FIG. 5, the machine readable instructions 900 of FIG. 9 begin execution at block 905 at which the image sampler 515 included in the image difference recognizer 500 samples or otherwise obtains a sample image representative of, for example, a detected advertisement undergoing version recognition. At block 910, the image signature generator 520 included in the image difference recognizer 500 generates a sample image signature representative of the sample image, as described above. Then, at block 915 the image signature matcher 525 included in the image difference recognizer 500 compares the sample image signature generated at block 910 with one or more reference image signatures representative of a respective one or more reference images corresponding to respective reference advertisements. In the case of video advertisements, at block 915 the image signature matcher 525 may employ scene change detection, as described above, to reduce processing to one scene signature for each detected scene (e.g., instead of processing the signatures for each of the individual images included in a detected scene). The reference image signatures and reference images are stored in a storage unit 510, as described above.

If the sample image (e.g., or scene) signature does not match any reference image signature (block 915), then at block 920 the reporting unit 530 included in the image difference recognizer 500 indicates that the sample image does not (e.g., or the sample images included in the detected scene do not) correspond to any recognized version of any recognized advertisement corresponding to the reference image(s) stored in the storage unit 510. Execution of the machine readable instructions 900 then ends. However, if the sample image (e.g., or scene) signature does match a reference image signature (block 915), the image signature matcher 525 selects the matching reference image from the storage unit 510. Then, at block 925 the difference signature generator 550 included in the image difference recognizer 500 generates a difference signature representative of each region of the sample image (e.g., or key image representative of the detected scene) corresponding spatially to a respective version-specific difference region associated with a particular version of the selected matching reference image (e.g., as specified by classification information in the storage unit 510).

Next, at block 930 the difference signature matcher 555 included in the image difference recognizer 500 compares the difference signature(s) generated at block 925 for the sample image (e.g., or key image) with the respective reference difference signature(s) stored in the storage unit 510 for the selected matching reference image. If no match is found (block 930), then at block 935 the reporting unit 530 indicates that the sample image does not correspond to any recognized version of the recognized advertisement corresponding to selected matching reference image. Execution of the machine readable instructions 900 then ends. However, if the difference signature(s) generated for the sample image match the respective reference difference signature(s) for a particular version of the selected matching reference image, then at block 940 the reporting unit 530 indicates that the sample image corresponds to the particular version of the reference advertisement indicated by the classification information in the storage unit 510 as being associated with the matching reference difference signatures and respective difference regions. Execution of the machine readable instructions 900 then ends.

Figure 10:
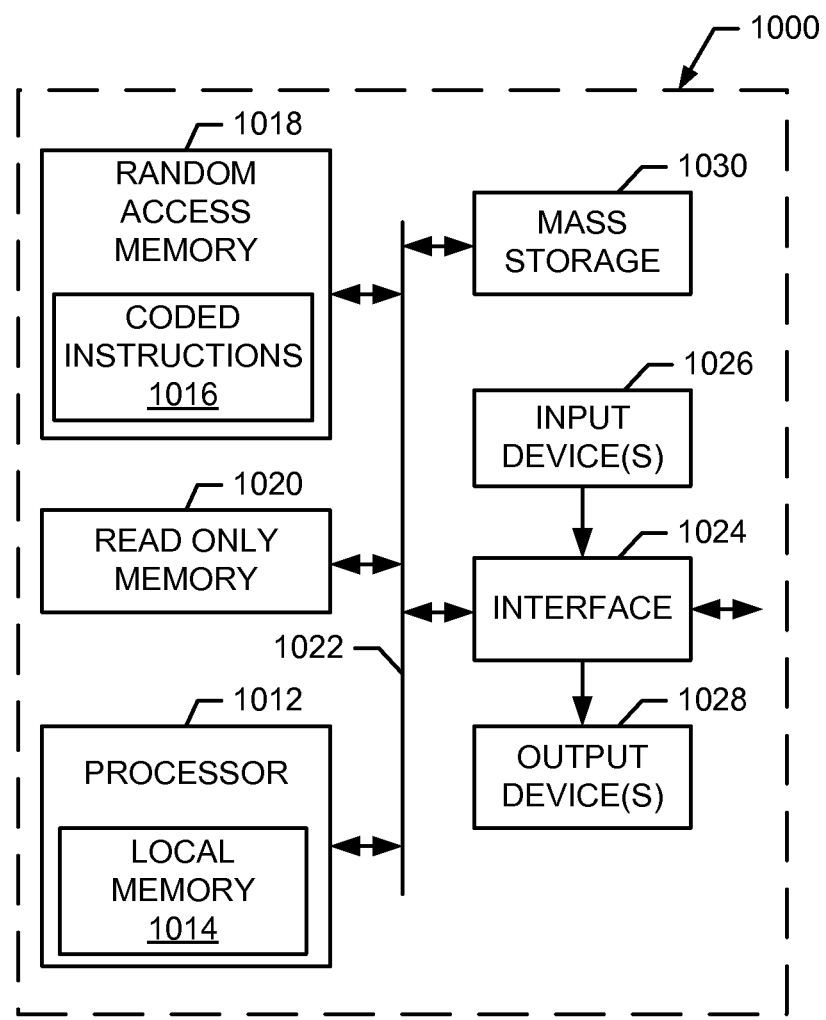
FIG. 10 is a block diagram of an example processing system that may execute the example machine readable instructions of any, some or all of FIGS. 6-9 to implement the image difference identification system of FIG. 1, the difference resolver of FIG. 3 and/or the image difference recognizer of FIG. 5.

FIG. 10 is a block diagram of an example processing system 1000 capable of implementing the apparatus and methods disclosed herein. The processing system 1000 can be, for example, a server, a personal computer, a personal digital assistant (PDA), an Internet appliance, or any other type of computing device.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, the machine readable instructions represented in FIGS. 6-9. The processor 1012 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The processing system 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1000 also includes one or more mass storage devices 1030 for storing software and data. Examples of such mass storage devices 1030 include floppy disk drives, hard drive disks, compact disk drives and digital versatile disk (DVD) drives. The mass storage device 1030 may implement the storage unit 110 and/or the storage unit 510. Alternatively, the volatile memory 1018 may implement the storage unit 110 and/or the storage unit 510.

As an alternative to implementing the methods and/or apparatus described herein in a system such as the processing system of FIG. 10, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to identify image versions, the method comprising:
   determining, with a processor, whether a difference between a block of pixels of a first image represented by a first signature and a block of pixels of a reference image represented by a second signature matching the first signature is resolvable using a transformation operation;
   in response to determining the difference is unresolvable using the transformation operation, including the block of pixels of the first image in a difference region of the first image;
   generating, with the processor, a third signature different from the difference region of the first image to represent the difference region of the first image, the third signature being a second image representative of the difference region of the first image and having lower resolution than the difference region of the first image; and
   storing the third signature with version information associated with the first image.

2. The method as defined in claim 1, wherein the third signature is larger than the first signature.

3. The method as defined in claim 1, wherein the transformation operation is a shift operation, the block of pixels of the reference image is a first block of pixels of the reference image, and further including determining that the difference is unresolvable using the shift operation when the block of pixels of the first image does not match any block of pixels in a neighborhood of the first block of pixels of the reference image.

4. The method as defined in claim 3, wherein the neighborhood of the first block of pixels of the reference image includes blocks of pixels adjacent to the first block of pixels of the reference image.

5. The method as defined in claim 1, wherein the transformation operation includes at least one of a color adjustment or an intensity adjustment, and further including determining that the difference is unresolvable using the transformation operation when at least one of the block of pixels of the first image is not flat or the block of pixels of the reference image is not flat.

6. The method as defined in claim 1, further including:
   determining a difference image based on the first image and the reference image; and
   partitioning the difference image to obtain the difference between the block of pixels of the first image and the block of pixels of the reference image.

7. A storage device or storage disk comprising machine readable instructions which, when executed, cause a processor to at least:
   determine whether a difference between a block of pixels of a first image represented by a first signature and a block of pixels of a reference image represented by a second signature matching the first signature is resolvable using a transformation operation;
   in response to determining the difference is unresolvable using the transformation operation, include the block of pixels of the first image in a difference region of the first image;
   generate a third signature different from the difference region of the first image to represent the difference region of the first image, the third signature being a second image representative of the difference region of the first image and having lower resolution than the difference region of the first image; and
   store the third signature with version information associated with the first image.

8. The storage device or storage disk as defined in claim 7, wherein the third signature is larger than the first signature.

9. The storage device or storage disk as defined in claim 7, wherein the transformation operation is a shift operation, the block of pixels of the reference image is a first block of pixels of the reference image, and the instructions, when executed, further cause the processor to determine that the difference is unresolvable using the shift operation when the block of pixels of the first image does not match any block of pixels in a neighborhood of the first block of pixels of the reference image.

10. The storage device or storage disk as defined in claim 9, wherein the neighborhood of the first block of pixels of the reference image includes blocks of pixels adjacent to the first block of pixels of the reference image.

11. The storage device or storage disk as defined in claim 7, wherein the transformation operation includes at least one of a color adjustment or an intensity adjustment, and the instructions, when executed, further cause the processor to determine that the difference is unresolvable using the transformation operation when at least one of the block of pixels of the first image is not flat or the block of pixels of the reference image is not flat.

12. The storage device or storage disk as defined in claim 7, wherein the instructions, when executed, further cause the processor to:
   determine a difference image based on the first image and the reference image; and
   partition the difference image to obtain the difference between the block of pixels of the first image and the block of pixels of the reference image.

13. An apparatus to identify image versions, the apparatus comprising:
   a difference resolver to:
      determine whether a difference between a block of pixels of a first image represented by a first signature and a block of pixels of a reference image represented by a second signature matching the first signature is resolvable using a transformation operation; and
      in response to determining the difference is unresolvable using the transformation operation, include the block of pixels of the first image in a difference region of the first image; and
   a difference signature generator to:
      generate a third signature different from the difference region of the first image to represent the difference region of the first image, the third signature being a second image representative of the difference region of the first image and having lower resolution than the difference region of the first image; and
      store the third signature with version information associated with the first image;
   wherein the difference resolver and the difference signature generator are implemented by at least one processor.

14. The apparatus as defined in claim 13, wherein the third signature is larger than the first signature.

15. The apparatus as defined in claim 13, wherein the transformation operation is a shift operation, the block of pixels of the reference image is a first block of pixels of the reference image, and the difference resolver is further to determine that the difference is unresolvable using the shift operation when the block of pixels of the first image does not match any block of pixels in a neighborhood of the first block of pixels of the reference image.

16. The apparatus as defined in claim 15, wherein the neighborhood of the first block of pixels of the reference image includes blocks of pixels adjacent to the first block of pixels of the reference image.

17. The apparatus as defined in claim 13, wherein the transformation operation includes at least one of a color adjustment or an intensity adjustment, and the difference resolver is further to determine that the difference is unresolvable using the transformation operation when at least one of the block of pixels of the first image is not flat or the block of pixels of the reference image is not flat.

* * * * *